United States Patent
Goss et al.

(10) Patent No.: US 8,596,536 B1
(45) Date of Patent: *Dec. 3, 2013

(54) METHODS AND SYSTEMS FOR TRANSFERRING INFORMATION BETWEEN A MOVABLE SYSTEM AND ANOTHER SYSTEM

(71) Applicant: Marvell International Technology Ltd., Hamilton (BM)

(72) Inventors: Steven M Goss, Corvallis, OR (US); Gregory F Carlson, Corvallis, OR (US); Ronald G Paul, Corvallis, OR (US); Todd A McClelland, Corvallis, OR (US); Randall L Stockberger, Jr., Independence, OR (US); Jerry A Marshall, Jr., Corvallis, OR (US)

(73) Assignee: Marvell International Technology Ltd. (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/716,684

(22) Filed: Dec. 17, 2012

Related U.S. Application Data

(63) Continuation of application No. 12/836,758, filed on Jul. 15, 2010, now Pat. No. 8,333,324, which is a continuation of application No. 11/300,797, filed on Dec. 15, 2005, now Pat. No. 7,770,794.

(51) Int. Cl.
*G06K 7/08* (2006.01)
*G06K 7/10* (2006.01)

(52) U.S. Cl.
USPC .................. 235/451; 235/472.02; 235/462.1

(58) Field of Classification Search
USPC .................. 235/451, 462.46, 472.01, 462.01; 358/475; 359/489.07; 74/89.22
See application file for complete search history.

(56) References Cited

U.S. PATENT DOCUMENTS

| | | | |
|---|---|---|---|
| 4,617,596 | A | 10/1986 | Yoshida et al. |
| 5,029,020 | A | 7/1991 | Norder et al. |
| 5,051,838 | A | 9/1991 | Cho et al. |
| 5,093,879 | A | 3/1992 | Bregman et al. |
| 5,172,243 | A | 12/1992 | Hayashi et al. |
| 5,402,156 | A | 3/1995 | Donahue et al. |
| 5,402,251 | A | 3/1995 | Ogasawara et al. |
| 5,574,804 | A | 11/1996 | Olschafskie et al. |
| 5,577,026 | A | 11/1996 | Gordon et al. |
| 5,595,445 | A | 1/1997 | Bobry |

(Continued)

OTHER PUBLICATIONS

Shepler, J. "How Bluetooth cuts the cords," Mar. 5, 2005 Available at www.searchmobilecom(2uting. techtarget. com/generic/O,295582, sid40 gci 1067872,00 .html.

(Continued)

*Primary Examiner* — Thien T Mai

(57) ABSTRACT

An image forming apparatus, which may be a printer, includes an image acquisition subsystem and a processing subsystem. The image acquisition subsystem includes an imager and a source. The imager is configured to scan an image while the image acquisition subsystem moves with respect to the image forming apparatus and configured to provide electrical signals including information related to the scanned image. The source is configured to emanate electromagnetic radiation based on the electrical signals. The processing subsystem includes a receiving component configured to receive the electromagnetic radiation emanated from the source of the image acquisition subsystem. The image forming apparatus also includes a structure supporting both the image acquisition subsystem and the processing subsystem.

20 Claims, 2 Drawing Sheets

(56) References Cited

U.S. PATENT DOCUMENTS

| | | | |
|---|---|---|---|
| 5,600,445 | A | 2/1997 | Omi |
| 5,610,387 | A | 3/1997 | Bard et al. |
| 5,812,179 | A | 9/1998 | Pensavecchia et al. |
| 5,874,722 | A | 2/1999 | Rando et al. |
| 6,061,159 | A | 5/2000 | Walsh |
| 6,081,629 | A | 6/2000 | Browning |
| 6,229,565 | B1 | 5/2001 | Bobry |
| 6,278,101 | B1 | 8/2001 | Puyot |
| 6,405,926 | B1 * | 6/2002 | Yomogida et al. ....... 235/462.46 |
| 6,422,100 | B1 * | 7/2002 | Li et al. ................. 74/89.22 |
| 6,442,403 | B1 | 8/2002 | Becot et al. |
| 6,446,871 | B1 * | 9/2002 | Buckley et al. .......... 235/472.03 |
| 6,476,849 | B1 | 11/2002 | Kerr et al. |
| 6,595,423 | B2 | 7/2003 | Cho et al. |
| 6,603,464 | B1 | 8/2003 | Rabin |
| 6,611,363 | B1 * | 8/2003 | Yannai et al. ............. 358/475 |
| 6,853,293 | B2 * | 2/2005 | Swartz et al. ............ 235/472.01 |
| 6,891,979 | B2 | 5/2005 | Hu et al. |
| 7,312,924 | B2 * | 12/2007 | Trissel .................... 359/489.07 |
| 7,364,082 | B2 | 4/2008 | Harel et al. |
| 7,457,007 | B2 | 11/2008 | Silverbrook et al. |
| 2002/0017567 | A1 * | 2/2002 | Connolly et al. ........ 235/472.02 |
| 2002/0194075 | A1 | 12/2002 | OHagan et al. |
| 2003/0046097 | A1 | 3/2003 | LaSalle et al. |
| 2003/0053513 | A1 | 3/2003 | Vatan et al. |
| 2003/0117670 | A1 | 6/2003 | Brugger et al. |
| 2004/0051752 | A1 | 3/2004 | Asauchi et al. |
| 2007/0285652 | A1 | 12/2007 | Nielsen et al. |

OTHER PUBLICATIONS

Esener, S. et al. "Present and Future Needs of Free-Space Optical Interconnects," IPDPS Workshops 2000, pp. 1104-119, Available at www.iodos.cc.aatech.edu/2000/wocs/18001109.pdf.

Yuceturk, E., et al. "Comparative study of very short distance electrical and optical interconnects based on channel characteristics," Optics in Computing (Trends in Optics and Photonics Series vol. 90), Optical Soc. of America, pp. 7-9 (Jun. 2003).

N. Savage, "Optical Interconnets: Fiber and free space create circuits," Laser Focus World, Jan. 2000.

I. O'Connor, "Optical Solutions for System Level Interconnects," SLIP'04, Feb. 14-15, 2004, Paris, France.

M.J. Kobrinsky et al., "On-Chip Optical Interconnects," Intel Technology Journal 8(2), May 10, 2004, pp. 129-142.

M. Sasaki et al., "A Wireless Chip Interconnect Using Resonant Coupling Between Spiral Inductors," Available at www.rcis.hiroshima-u.ac.jp/21coe/E/resultlresult2-1.html.

M.F. Chang et al. "RFIWireless Interconnect for inter- and Intra-Chip Communications," Proceedings of the IEEE 89(4), Apr. 2001, pp, 456-466.

R. Kolic, "An introduction to Wireless USB (WUSB)," Available at www.deviceforae.com/articles/AT9015145687.html (Feb. 21, 2004).

* cited by examiner

METHODS AND SYSTEMS FOR TRANSFERRING INFORMATION BETWEEN A MOVABLE SYSTEM AND ANOTHER SYSTEM

This patent application is a continuation of U.S. patent application Ser. No. 12/836,758, filed on Jul. 15, 2010, which is a continuation of U.S. patent application Ser. No. 11/300, 797 (now U.S. Pat. No. 7,770,794), filed Dec. 15, 2005. Both U.S. patent application Ser. No. 12/836,758 and U.S. patent application Ser. No. 11/300,797 are incorporated by reference herein in their entirety.

BACKGROUND OF THE INVENTION

1. Technical Field

Many systems (such as, for example, scanners, printers, and recording devices) include, within the system enclosure, a movable subsystem and another subsystem, where the two subsystems transfer information.

A typical example is the image acquisition subsystem in a scanner and the processing subsystem. In such an example, the image acquisition subsystem includes an image acquisition device that acquires a scanned image. The scanned image data has to be transferred to the processing subsystem. However, typically the image acquisition subsystem moves over the item to be scanned. In conventional systems, a flexible cable connects the image acquisition subsystem to the processing subsystem. In applications where the data rate of the information being transferred between the two subsystems is high, the presence of a long cable can result in signal degradation and the cable itself to serve as a source of radiofrequency interference, either by transmitting or receiving radiofrequency interference. The continued motion of the cable can also result in quality problems.

Furthermore, although in recent years there has been significant effort in reducing the impedance of connections, there are practical (such as cost) and physical limits to the decrease in the impedance of connections. The impedance of the connection is a factor in the degradation of the signal in a long connection.

The above described problems are typical of a movable subsystem connected to another subsystem by a flexible cable. There it is, therefore, a need for a more reliable method of connecting a movable subsystem to another subsystem.

BRIEF SUMMARY OF THE INVENTION

One embodiment of the system of this invention includes a movable subsystem operatively connected to a structure. In one instance, the movable subsystem includes an electrical component capable of providing electrical signals, where the electrical signals comprise information, a source of electromagnetic radiation, and a modulating component capable of receiving the electrical signals and of modulating the source of electromagnetic radiation, wherein the modulated electromagnetic radiation comprises the information. One embodiment of the system of this invention also includes another subsystem operatively connected to the structure, where the other subsystem includes a receiving component capable of receiving electromagnetic radiation emanating from the source of electromagnetic radiation and of converting the received electromagnetic radiation into other electrical signals, and another electrical component capable of receiving the other electrical signals. In a further embodiment, the movable subsystem also includes a receiving component and the other subsystem also includes a source of electromagnetic radiation and a modulating component.

For a better understanding of the present invention, together with other and further needs thereof, reference is made to the accompanying drawings and detailed description and its scope will be pointed out in the appended claims.

DETAILED DESCRIPTION OF THE INVENTION

Unless defined otherwise below, all technical and scientific terms used herein have the same meaning as commonly understood by one of ordinary skill in the art to which this invention belongs. Still, certain terms are defined herein for the sake of clarity.

The following definitions are provided for specific terms that are used in the following written description.

The term "RF signals," as used herein, refers to the portion of the electromagnetic radiation spectrum below $10^{12}$ Hz (below 1000 GHz).

The term "optical signal," as used herein, refers to the portion of the electromagnetic radiation spectrum above $10^{11}$ Hz (infrared and above, including visible, ultraviolet, x-ray radiation and above).

The term "electrical signal," as used herein, refers to a signal that is transmitted by means of wired connections.

The term "imager," as used herein, refers to a device that converts optical signals into electrical signals and enables the acquiring of electrical signals representing an image.

Figure 1:
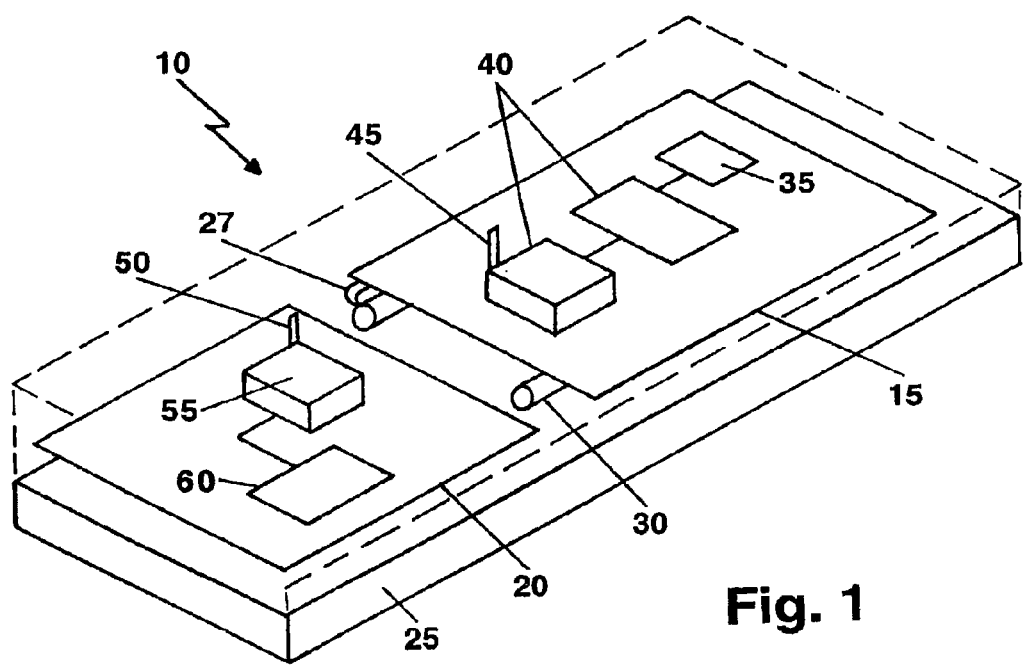
FIG. 1 is a pictorial schematic description of an embodiment of the system of this invention.

An embodiment 10 of the system of this invention is shown in FIG. 1. Referring to FIG. 1, the embodiment 10 shown therein includes a movable subsystem 15 and another subsystem 20, which in the embodiment shown is a fixed subsystem. The movable subsystem 15 is operatively connected to the structure 25. In the embodiment shown in FIG. 1, two support rails 30 are attached to the structure 25. In one embodiment, the system of this invention not being limited only to this embodiment, the movable subsystem 15 is movably mounted on the two support rails 30 by means of rollers 27. In other embodiments (not shown), the movable subsystem 15 may be coupled to a lead screw, which is driven by a motor attached to the structure 25, or, the movable subsystem 15 may be attached to a cam follower that moved on a cam driven by a motor attached to the structure 25. (The above are only a few of the many possible mechanical designs for a movable subsystem operatively connected to a structure.) The movable subsystem 15 includes an electrical component 35 capable of providing electrical signals, where the electrical signals carry information. In one embodiment the electrical component is an imager, such as, but not limited to, a CCD or CMOS imager, that receives image optical information and converts it to image electrical information. The electrical information originating at the electrical component 35 can be received at a modulating component 40. The modulating component 40 is capable of modulating a source of electromagnetic radiation 45 so that the electromagnetic radiation emitted by the source 45 carries the information that was carried by the electrical signals. In the embodiment shown in FIG. 1, the source of electromagnetic radiation is an antenna 45. The modulating component 40, when the source of electromagnetic radiation is an antenna, is a modulator/transmitter (a conventional component in radio/RF systems).

The other subsystem 20 in FIG. 1 includes a receiving component 50 that is capable of receiving the electromagnetic radiation emitted by the source 45. In the embodiment shown in FIG. 1, the receiving component 50 is another antenna 50 connected to a receiver 55. The other antenna 50 converts the electromagnetic radiation received from the source 45 into modulated electrical signals. The receiver 55 demodulates the modulated electrical signals and provides the demodulated electrical signals to another electrical component 60. The information that was carried by the modulated electromagnetic radiation emitted by the source 45 is carried by the demodulated electrical signals received by the other electrical component 60.

In the embodiment shown in FIG. 1, the source 45 and the receiving component 50 are substantially collinear. In embodiments in which the source 45 and the receiving component 50 are substantially collinear, the source 45 and the receiving component 50 are substantially aligned with respect to which other. There are embodiments of this invention in which the source 45 and the receiving component 50 are substantially aligned with respect to each other without being collinear.

In the embodiment in which the source of electromagnetic radiation is an antenna and the receiving component is another antenna, embodiments in which the source antenna is substantially omnidirectional do not have to be necessarily aligned. The decision to select an embodiment where the source and the receiving component are aligned involves considerations of cost, power requirements, and electromagnetic interference and compatibility.

In embodiments, such as the embodiment 10 shown in FIG. 1, in which the source 45 and the receiving component 50 are RF antennae, the modulating component 40 and the receiver/demodulator can be selected so that they conform to one of the many available standards. Present-day standards include Bluetooth, WiFi (IEEE 802.11) and quasi-standards such as UWB or wireless USB. Embodiments of the system of this invention conforming to any of these standards are within the scope of this invention.

In another embodiment, the source 45 and the receiving component 50 emit and receive radiation by near Field coupling, where such coupling can be capacitive or inductive. Such embodiments of the system of this invention are also within the scope of this invention. In embodiments based on near Field coupling, the distinction between the source 45 and the receiving component 50 is blurred and both the source 45 and the receiving component 50 can be considered as generalized near Field antennas. In some embodiments utilizing near Field coupling a same component can be both a source and a receiving component.

Figure 2:
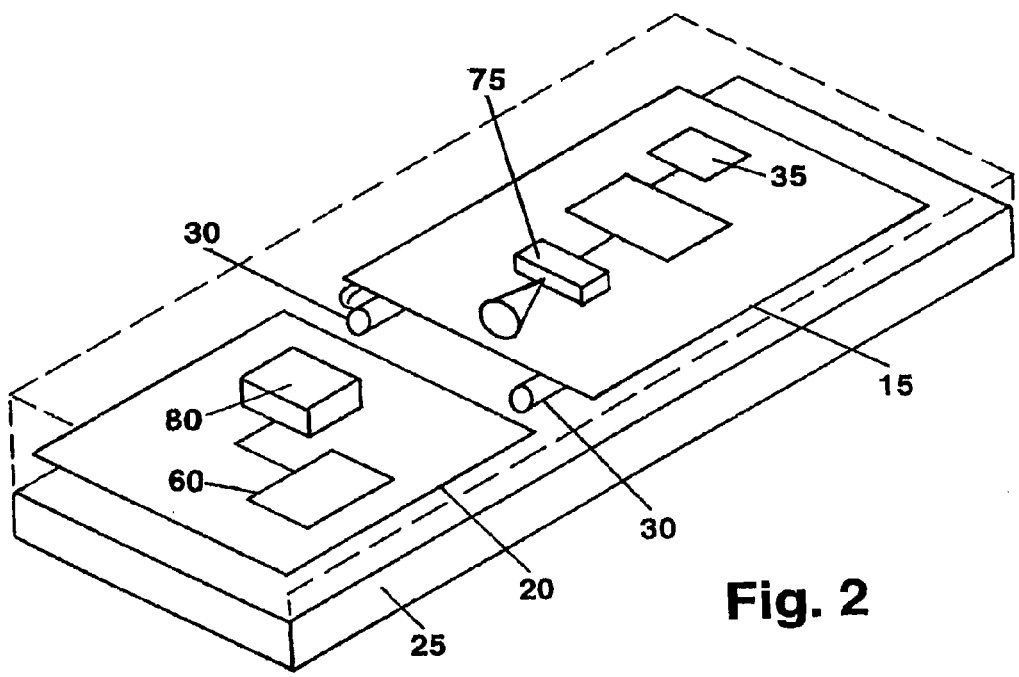
FIG. 2 is a pictorial schematic description of another embodiment of the system of this invention.

An embodiment in which the source of electromagnetic radiation is an optical source and the receiving component is a detector is shown in FIG. 2. Components in FIG. 2 that are similar to components in FIG. 1 are labeled with the same numerical label as the corresponding component in FIG. 1. The optical source 75 in FIG. 2 can be, in one embodiment, but is not limited to, a VCSEL (vertical Cavity Surface emitting Laser) or any other form of a laser diode or LED. The detector 80 can be one of the many possible optical detectors (for example, but not limited to, one of the detectors described in E. L. Dereniak, D. G. Crowe, Optical radiation Detectors, ISBN 0-471-89797-3, 1984). In some embodiments, the receiving component may also include a demodulator.

It should be noted that, in embodiments utilizing an optical source, the optical source may include optical elements to collimate, focus, or otherwise modify the emitted optical beam and that the detector may include optical elements to collimate, focus, or otherwise modify the received optical beam.

Exemplary embodiments of the system of this invention include embodiments in which the movable subsystem 15 is a scanning subsystem and the electrical component 35 is an imager. In conventional scanners, the scanning subsystem is electrically connected to other subsystems by means of a cable (typically, a flexible cable) with a service loop.

Figure 3:
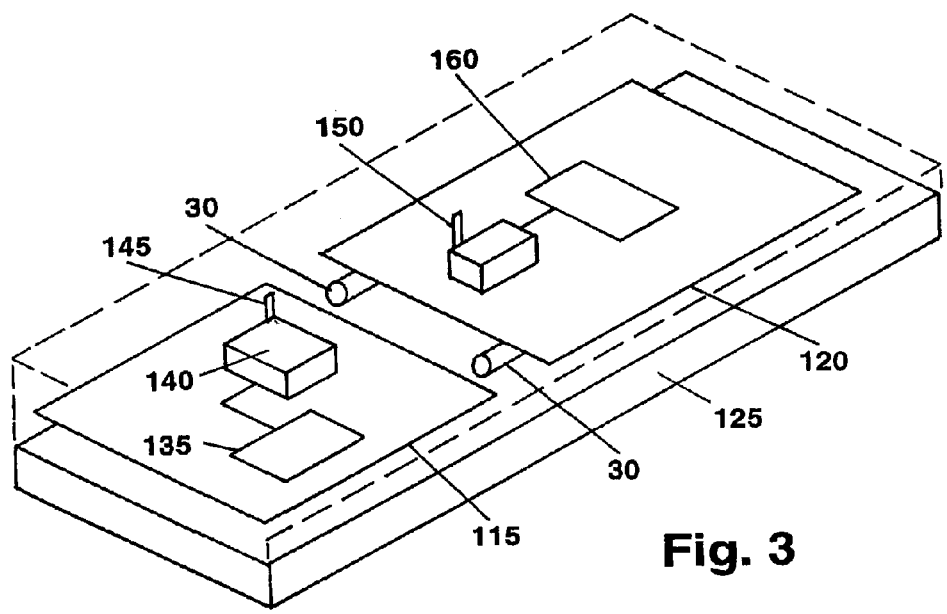
FIG. 3 is a pictorial schematic description of yet another embodiment of the system of this invention.

An embodiment of the system of this invention in which the electrical component capable of providing the electrical signals is located in another subsystem, which is a subsystem attached to the structure, is shown in FIG. 3. Referring to FIG. 3, a subsystem 115 is attached to the structure 125. The subsystem 115 includes an electrical component 135 capable of providing electrical signals where the electrical signals carry information, a modulating component 140 that receives the electrical signals and modulates a source of electromagnetic radiation 145. The modulated electromagnetic radiation carries the information. A movable subsystem 120 includes a receiving component 150 that receives the modulated electromagnetic radiation and converts the modulated electromagnetic radiation into other electrical signals and another electrical component 160 that receives the electrical signals obtained from demodulating the electromagnetic radiation. The movable subsystem 120 is operatively connected to the structure 125. The operative connection may be, but is not limited to, one of the embodiments described hereinabove. In the embodiment shown in FIG. 3, the source 145 of electromagnetic radiation is an antenna 145 and the receiving component 150 includes another antenna and a receiver. In other embodiments, the source 145 of electromagnetic radiation can be an optical source and the receiving component 150 can include an optical detector. Note that the source 145 and the receiving component can be substantially aligned with each other or substantially collinear.

An exemplary embodiment of the system shown in FIG. 3 is a printer in which the print head is located in the movable subsystem 120. Print information is generated by the electrical component 135 and has to be transmitted to the printing component 160.

Figure 4:
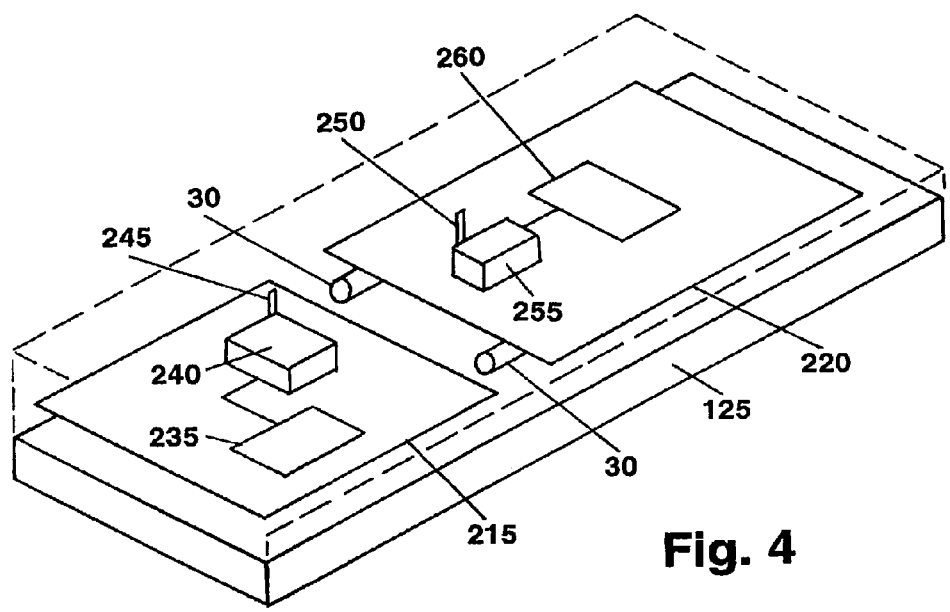
FIG. 4 is a pictorial schematic description of a further embodiment of the system of this invention.

It should be noted that embodiments that combine the features of the embodiment shown in FIGS. 1 and 3 are also within the scope of this invention. In embodiments such as the embodiment shown in FIG. 4, the mobile subsystem 220 includes a transmitting/receiving antenna 250, a transceiver 255 and an electrical component 260. The other subsystem 215 includes another transmitting/receiving antenna 245, another transceiver 240 and another electrical component 235. It should be noted that the transmitting/receiving antenna 250, 245 can be antennas and the transceiver 240, 255 can be a receiver and a separate modulator. Thus, the antennas 245, 250 and their corresponding transceivers 240, 255 can act as either sources of electromagnetic radiation or as receiving components, wherein the transceivers act as modulating components when their corresponding antenna acts as a source of electromagnetic radiation.

During operation of the embodiments of the system this invention, electrical signals that carry information are converted into modulated electromagnetic radiation, where the modulated electromagnetic radiation also carries the information. The modulated electromagnetic radiation is propagated between a movable subsystem and another subsystem. The propagated electronic radiation is received and then converted back into electrical signals. In that manner at the information is carried by electrical signals initially, by electromagnetic radiation after the electromagnetic radiation is modulated by the electrical signals, and finally the information is carried again by electrical signals which are obtained by demodulating the electromagnetic radiation. In the embodiments of the system of this invention, the movable system is operatively connected to a structure and the other system is also operatively connected to the same structure.

Although, in the embodiments shown hereinabove, one subsystem is a movable subsystem and the other subsystem is a fixed subsystem, embodiments in which both subsystems are movable are within the scope of this invention.

Although the invention has been described with respect to various embodiments, it should be realized this invention is also capable of a wide variety of further and other embodiments within the spirit and scope of the appended claims.

What is claimed is:

1. A receiver comprising:
   a receiving component configured to receive a data signal transmitted from a moveable scanner and configured for installation within a housing, wherein the moveable scanner is configured to be driven by a motor to move with respect to the receiver while supported by the housing; and
   an electrical component configured to process data within the data signal and configured to be supported by the housing, wherein the electrical component is physically connected to the housing supporting the moveable scanner.

2. The receiver of claim 1, wherein the data signal is a wireless signal using Bluetooth or IEEE 802.11 standard.

3. The receiver of claim 1, wherein the receiver and the moveable scanner are aligned collinearly with respect to each other.

4. The receiver of claim 1, wherein the receiving component comprises an antenna.

5. The receiver of claim 1, wherein the receiving component includes a detector configured to receive the data signal from an optical source.

6. The receiver of claim 1, further comprising:
   a processor configured to generate a separate data signal, and
   a transmitting component configured to transmit the separate data signal to the moveable scanner.

7. A scanner, comprising:
   a moveable scanner including:
      a mechanism configured to be driven by a motor;
      an imager configured to scan an image while the mechanism moves with respect to the scanner and to generate data signals including data corresponding to the scanned image; and
      a transmitter configured to transmit the data signal;
   a receiver including a receiving component configured to receive the data signal transmitted from the transmitter of the moveable scanner; and
   a structure configured to support the receiver while the moveable scanner moves with respect to the structure, wherein the moveable scanner and the receiver are configured to be installed within the structure.

8. The scanner of claim 7, further comprising:
   a print head configured to print the data related to the scanned image.

9. The scanner of claim 7, wherein the receiver further comprises an electrical component configured to process the data signal corresponding to the scanned image.

10. The scanner of claim 7, wherein the mechanism comprises a roller mounted on a rail of the structure.

11. The scanner of claim 7, wherein the mechanism is coupled to a lead screw driven by a motor attached to the structure.

12. The scanner of claim 7, wherein the mechanism is attached to a cam follower that is moved on a cam driven by a motor attached to the structure.

13. The scanner of claim 7, wherein the receiving component is an RF antenna.

14. The scanner of claim 7, wherein the transmitter is configured to transmit the data signal according to near-field coupling.

15. The scanner of claim 7, wherein the moveable scanner is one of a laser, a laser diode or an LED.

16. A method of communication between a moveable scanner and a receiver, the method comprising:
   scanning an image while a mechanism of the moveable scanner moves with respect to the receiver, wherein the mechanism of the moveable scanner is driven by a motor;
   converting the scanned image to electrical signals;
   transmitting the electrical signals; and
   receiving, at the receiver, the electrical signals, wherein the moveable scanner and the receiver are physically supported by and installed within a support structure.

17. The method of claim 16, wherein the mechanism is physically connected to the support structure, and
   wherein the mechanism is at least one of a lead screw, a cam follower, or a roller mounted on a rail of the support structure.

18. The method of claim 16, wherein the moveable scanner is one of a laser, a laser diode or an LED.

19. The method of claim 16, wherein the electrical signal is transmitted according to near-field coupling, RF communication, or optical communication.

20. The method of claim 16, further comprising:
   printing an image based at least in part on the electrical signals.

* * * * *